(12) United States Patent
Leung et al.

(10) Patent No.: US 8,787,303 B2
(45) Date of Patent: Jul. 22, 2014

(54) METHODS AND APPARATUS FOR DATA TRAFFIC OFFLOADING AT A ROUTER

(75) Inventors: Kent K. Leung, Palo Alto, CA (US); Jayaraman Iyer, San Jose, CA (US); Flemming Andreasen, Marlboro, NJ (US); Timothy Stammers, Raleigh, NC (US); Michel Khouderchah, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 525 days.

(21) Appl. No.: 13/112,581

(22) Filed: May 20, 2011

(65) Prior Publication Data

US 2012/0082161 A1 Apr. 5, 2012

Related U.S. Application Data

(60) Provisional application No. 61/389,971, filed on Oct. 5, 2010.

(51) Int. Cl.
*H04W 36/12* (2009.01)
*H04W 36/26* (2009.01)

(52) U.S. Cl.
USPC ........... 370/330; 370/329; 709/238; 709/239; 709/240

(58) Field of Classification Search
CPC ......... H04L 45/00; H04L 47/00; H04L 47/10; H04L 47/12; H04L 47/122; H04L 47/125; H04W 40/00; H04W 8/08; H04W 8/082; H04W 76/02; H04W 76/021; H04W 76/022
USPC ................... 370/229, 230; 709/238, 239, 240
See application file for complete search history.

(56) References Cited

U.S. PATENT DOCUMENTS

| 5,898,713 | A | 4/1999 | Melzer et al. |
| 6,643,621 | B1 | 11/2003 | Dodrill et al. |

(Continued)

FOREIGN PATENT DOCUMENTS

| EP | 1250022 A1 | 10/2002 |
| EP | 1619917 A1 | 1/2006 |

(Continued)

OTHER PUBLICATIONS

3GPP TR 23.8xy V0.2.0 (Sep. 2009) 3rd Generation Partnership Project; Technical Specification Group Services and System Aspects; Local IP Access and Selected IP Traffic Offload;(Release 10).*

(Continued)

*Primary Examiner* — Ayaz Sheikh
*Assistant Examiner* — Tarell Hampton
(74) *Attorney, Agent, or Firm* — Wilmer Cutler Pickering Hale and Dorr LLP (57) ABSTRACT

This disclosure relates to a system and method for offloading selected data traffic in logical tunnels to the Internet. The offloading provides another data path for selected data traffic that can relieve the burden on a mobile operator's network, such as the backhaul and core networks. As the proliferation of data rich content and increasingly more capable mobile devices has continued, the amount of data communicated over mobile operator's networks has increased. Upgrading the existing network that was designed for voice calls is not desirable or practical for many mobile operators. This disclosure provides systems and methods for offloading data to the Internet at a router to relieve congestion on the mobile operator's network.

20 Claims, 7 Drawing Sheets

(56) References Cited

U.S. PATENT DOCUMENTS

| | | | |
|---|---|---|---|
| 6,917,592 | B1 | 7/2005 | Ramankutty et al. |
| 7,792,113 | B1 | 9/2010 | Foschiano et al. |
| 7,808,919 | B2 | 10/2010 | Nadeau et al. |
| 7,827,256 | B2 | 11/2010 | Phillips et al. |
| 7,856,512 | B2 | 12/2010 | Hilla et al. |
| 7,885,248 | B2 | 2/2011 | Harper et al. |
| 7,885,260 | B2 | 2/2011 | Paul et al. |
| 7,890,636 | B2 | 2/2011 | Grayson et al. |
| 2003/0028644 | A1 | 2/2003 | Maguire et al. |
| 2004/0224678 | A1 | 11/2004 | Dahod et al. |
| 2005/0091371 | A1 | 4/2005 | Delegue et al. |
| 2005/0239473 | A1 | 10/2005 | Pan et al. |
| 2006/0018328 | A1 | 1/2006 | Mody et al. |
| 2006/0234678 | A1 | 10/2006 | Juitt et al. |
| 2006/0291388 | A1 | 12/2006 | Amdahl et al. |
| 2007/0097983 | A1 | 5/2007 | Nylander et al. |
| 2007/0105568 | A1 | 5/2007 | Nylander et al. |
| 2007/0116019 | A1 | 5/2007 | Cheever et al. |
| 2007/0116020 | A1 | 5/2007 | Cheever et al. |
| 2007/0243872 | A1 | 10/2007 | Gallagher et al. |
| 2007/0253328 | A1 | 11/2007 | Harper et al. |
| 2008/0137541 | A1 | 6/2008 | Agarwal et al. |
| 2008/0162637 | A1 | 7/2008 | Adamczyk et al. |
| 2008/0188223 | A1 | 8/2008 | Vesterinen et al. |
| 2008/0316980 | A1 | 12/2008 | Ahlen et al. |
| 2009/0017864 | A1* | 1/2009 | Keevill et al. ............... 455/552.1 |
| 2009/0061821 | A1 | 3/2009 | Chen et al. |
| 2009/0061873 | A1 | 3/2009 | Bao et al. |
| 2009/0067417 | A1 | 3/2009 | Kalavade et al. |
| 2009/0086742 | A1 | 4/2009 | Ghai et al. |
| 2009/0089447 | A1 | 4/2009 | Balachandran et al. |
| 2009/0098872 | A1 | 4/2009 | Deshpande et al. |
| 2009/0129271 | A1 | 5/2009 | Ramankutty et al. |
| 2009/0156213 | A1 | 6/2009 | Spinelli et al. |
| 2009/0207759 | A1 | 8/2009 | Andreasen et al. |
| 2009/0215438 | A1 | 8/2009 | Mittal et al. |
| 2009/0262682 | A1 | 10/2009 | Khetawat et al. |
| 2009/0286510 | A1 | 11/2009 | Huber et al. |
| 2010/0077102 | A1 | 3/2010 | Lim et al. |
| 2010/0091653 | A1 | 4/2010 | Koodli et al. |
| 2010/0124933 | A1 | 5/2010 | Chowdhury et al. |
| 2010/0195640 | A1 | 8/2010 | Park et al. |
| 2010/0291897 | A1 | 11/2010 | Ghai |
| 2011/0021192 | A1 | 1/2011 | Grayson et al. |
| 2011/0021196 | A1 | 1/2011 | Grayson et al. |
| 2011/0058479 | A1 | 3/2011 | Chowdhury |
| 2011/0075557 | A1 | 3/2011 | Chowdhury et al. |
| 2011/0075675 | A1 | 3/2011 | Koodli et al. |
| 2011/0185049 | A1* | 7/2011 | Atreya et al. ................. 709/222 |
| 2012/0224536 | A1* | 9/2012 | Hahn et al. .................... 370/328 |
| 2013/0258963 | A1* | 10/2013 | Mihaly et al. ................. 370/329 |

FOREIGN PATENT DOCUMENTS

| | | | |
|---|---|---|---|
| EP | 1978685 A1 | 10/2008 | |
| WO | WO-2009089455 A1 | 7/2009 | |

OTHER PUBLICATIONS

"Stoke Mobile Data Offload Solution Brief", Aug. 2009, 4 pgs. ("Stoke").*

Kundalkar et al., "LIPA: Local IP Access via Home Node B", Nov. 13, 2009.*

3GPP TR 25.820 v8.0.0 (Mar. 2008), 3rd Generation Partnership Project; Technical Specification Group Radio Access Networks; 3G Home NobeB Study Item Technical Report (Release 8); http://www.3gpp.org, 2008. 37 pages.

3GPP TR 29.814 v7.1.0 (Jun. 2007), 3rd Generation Partnership Project; Technical Specification Group Core Networks and Terminals Feasibility Study on Bandwidth Savings at Nb Interface with IP transport (Release 7), Global System for Mobile Communications, http://www.3gpp.org, 2007. 19 pages.

3GPP TS 22.011 v8.4.0 (Jun. 2008), 3rd Generation Partnership Project; Technical Specification Group Services and System Aspects; Service accessibility (Release 8), Global System for Mobile Communications, http://www/3gpp.org, 2008. 25 pages.

3GPP TS 22.220 v0.3.0 (Jul. 2008), 3rd Generation Partnership Project; Technical Specification Group Services and System Aspects; Service requireements for Home NodeBs and Home eNodeBs; (Release 9), http://www.3gpp.org, 2008. 13 pages.

3GPP TS 23.041 v7.0.0 (Mar. 2006), 3rd Generation Partnership Project; Technical Specification Group Terminals; Technical realization of Cell Broadcast Service (CBS) (Release 7), Global System for Mobile Communications, http://www.3gpp.org, 2006. 36 pages.

3GPP TS 23.060 v8.1.0 (Jun. 2008), 3rd Generation Partnership Project; Technical Specification Group Services and System Aspects; General Packet Radio Service (GPRS); Service description; Stage 2 (Release 8), Global System for Mobile Communications, http://www.3gpp.org, 2008. 259 pages.

3GPP TS 23.107 v7.1.0 (Sep. 2007), 3rd Generation Partnership Project; Technical Specification Group Services and System Aspects; Quality of Service (QoS) concept and architecture (Release 7), http://www.3gpp.org, 2007. 40 pages.

3GPP TS 23.153 v7.2.0 (Mar. 2007), 3rd Generation Partnership Project; Technical Specification Group Core Network and Terminals; Out of band transcoder control; Stage 2 (Release 7); Global System for Mobile Communications, http://www.3gpp.org, 2007. 77 pages.

3GPP TS 23.228 v8.5.0 (Jun. 2008), 3rd Generation Partnership Project; Technical Specification Group Services and System Aspects; IP Multimedia Subsystem (IMS); Stage 2 (Release 8), http://www.3gpp.org, 2008. 240 pages.

3GPP TS 23.234 v7.7.0 (Jun. 2008), 3rd Generation Partnership Project; Technical Specification Group Services and System Aspects; 3GPP system to Wireless Local Area Network (WLAN) interworking; System description (Release 7), http://www.3gpp.org, 2008. 85 pages.

3GPP TS 23.236 v7.0.0 (Dec. 2006), 3rd Generation Partnership Project; Technical Specification Group Services and System Aspects; Intra-domain connection of Radio Access Network (RAN) nodes to multiple Core Network (CN) nodes (Release 7); Global System for Mobile Communications, http://www.3gpp.org, 2006. 37 pages.

3GPP TS 23.251 v7.0.0 (Jun. 2007), 3rd Generation Partnership Project; Technical Specification Group Services and System Aspects; Network Sharing; Architecture and functional description (Release 7), Global System for Mobile Communications, http://www.3gpp.org, 2007. 18 pages.

3GPP TS 24.234 v7.5.0 (Mar. 2007), 3rd Generation Partnership Project; Technical Specification Group Core Network and Terminals; 3GPP System to Wireless Local Area Network (WLAN) interworking; WLAN User Equipment (WLAN UE) to network protocols; Stage 3 (Release 7), Global System for Mobile Communications, http://www.3gpp.org, 2007. 32 pages.

3GPP TS 25.412 v7.1.0 (Jun. 2006), 3rd Generation Partnership Project; Technical Specification Group Radio Access Network; UTRAN Iu interface signaling transport (Release 7), http://www.3gpp.org, 2006. 11 pages.

3GPP TS 25.410 v7.0.0 (Mar. 2006), 3rd Generation Partnership Project; Technical Specification Group Radio Access Network; UTRAN Iu Interface: general aspects and principles (Release 7), http://www.3gpp.org, 2006. 28 pages.

3GPP TS 25.411 v7.1.0 (Sep. 2007), 3rd Generation Partnership Project; Technical Specification Group Radio Access Network; UTRAL Iu interface layer 1 (Release 7), http://www.3gpp.org, 2007. 9 pages.

3GPP TS 25.413 V7.8.0 (Dec. 2007), 3rd Generation Partnership Project; Technical Specification Group Radio Access Network; UTRAN Iu interface RANAP signaling (Release 7), http://www.3gpp.org, 2007. 359 pages.

3GPP TS 25.414 v7.1.0 (Sep. 2006), 3rd Generation Partnership Project; Technical Specification Group Radio Access Network; UTRAN Iu interface transport and transport signaling (Release 7), http://www.3gpp.org, 2006. 20 pages.

3GPP TS 25.415 v7.3.0 (Dec. 2006), 3rd Generation Partnership Project; Technical Specification Group Radio Access Network; UTRAN Iu interface user plane protocols (Release 7), http://www.3gpp.org, 2006. 64 pages.

(56) References Cited

OTHER PUBLICATIONS

3GPP TS 25.419 v7.0.0 (Mar. 2006), 3rd Generation Partnership Project; Technical Specification Group RAN; UTRAN Iu-BC Interface: Service Area Broadcast Protocol (SABP) (Release 7), http://www.3gpp.org, 2006. 77 pages.

3GPP TS 29.163 v8.3.0 (May 2008), 3rd Generation Partnership Project; Technical Specification Group Core Network and Terminals; Interworking between the IP Multimedia (IM) Core Network (CN) subsystem and Circuit Switched (CS) networks (Release 8), Global System for Mobile Communications, http://www.3gpp.org, 2008. 237 pages.

3GPP TS 29.232 v8.3.0 (Jun. 2008), 3rd Generation Partnership Project; Technical Specification Group Core Network and Terminals; Media Gateway Controller (MGC)—Media Gateway (MGW) interface; Stage 3 (Release 8), http://www.3gpp.org, 2008. 145 pages.

3GPP TS 29.234 v7.9.0 (Jun. 2008), 3rd Generation Partnership Project; Technical Specification Group Core Network and Terminals; 3GPP system to Wirelss Local Area Network (WLAN) interworking; Stage 3 (Release 7); http://www.3gpp.org, 2008. 92 pages.

3GPP TS 29.332 v8.2.0 (Jun. 2008), 3rd Generation Partnership Project; Technical Specification Group Core Network and Terminals; Media Gateway Control Function (MGCF)—IM Media Gateway; Mn Interface (Release 8), http://www.3gpp.org, 2008. 73 pages.

3GPP TS 29.414 v8.1.0 (May 2008), 3rd Generation Partnership Project; Technical Specification Group Core Network and Terminals; Core network Nb data transport and transport signalling (Release 8), Global System for Mobile Communications, http://www.3gpp.org, 2008. 29 pages.

3GPP TS 29.415 v8.0.0 (May 2008), 3rd Generation Partnership Project; Technical Specification Group Core Network and Terminals; Core Network Nb Interface User Plane Protocols (Release 8), Global System for Mobile Communications, http://www.3gpp.org, 2008. 14 pages.

3GPP TS 33.234 v8.1.0 (Mar. 2008), 3rd Generation Partnership Project; Technical Specification Group Service and System Aspects; 3G Security; Wirelss Local Area Network (WLAN) interworking security (Release 8), http://www.3gpp.org, 2008. 101 pages.

3GPP TS 43.318 v8.1.0 (Feb. 2008), 3rd Generation Partnership Project; Technical Specification Group GSM/EDGE Radio Access Network; Generic Access Network (GAN); Stage 2 (Release 8); Global System for Mobile Communications, http://www.3gpp.org, 2008. 122 pages.

3GPP TS. 23.203 v. 11.3.0 Technical Specification. "$3^{rd}$ Generation Partnership Project; Technical Specification Group Services and System Aspects; Policy and charging control architecture (Release 11)", Sep. 2011, 167 pages.

3GPP TS. 23.401 v. 10.5.0 Technical Specification. "$3^{rd}$ Generation Partnership Project; Technical Speficiation Group Services and System Aspects: General Packet Radio Service (GPRS) enhancements for Evolved Universal Terrestrial Radio Access Network (E-UTRAN) access (Release 10)." Sep. 2011, 282 pages.

3GPP TS. 23.829 v. 10.0.1 Technical Specification. "$3^{rd}$ Generation Partnership Project; Technical Specification Group Services and System Aspects; Local IP Access and Selected IP Traffic Offload (LIPA-SIPTO) (Release 10)." Oct. 2011, 43 pages.

3GPP TS 23.236 v. 10 Technical Specification. "3rd Generation Partnership Project; Technical Specification Group Services and Systems Aspects; Intra-Domain Connection of Radio Access Network (RAN) Nodes to Multiple Cor Network (CN) Nodes (Release 10)." Mar. 2010. 39 pages.

* cited by examiner

METHODS AND APPARATUS FOR DATA TRAFFIC OFFLOADING AT A ROUTER

CROSS-REFERENCE TO RELATED APPLICATIONS

This application claims benefit under 35 U.S.C. §119(e) of U.S. Provisional Patent Application No. 61/389,971, entitled "SYSTEM AND METHOD FOR PROVIDING TRAFFIC OFFLOAD FOR LOGICAL TUNNELS," filed Oct. 5, 2010, and is hereby incorporated by reference herein in its entirety.

FIELD OF THE DISCLOSURE

This disclosure relates generally to a system and method for offloading data traffic through logical tunnels.

BACKGROUND

Wireless networks are tele or data communications networks that use radio waves to carry information from one node in the network to one or more receiving nodes in the network. Cellular networks are characterized by the use of radio cells that provide radio coverage for a geographic area, with multiple cells arranged to provide contiguous radio coverage over a larger area. Wired communication can also be used in portions of a wireless network, such as between cells or access points. Wireless communication technologies are used in connection with many applications, including, for example, satellite communications systems, portable digital assistants (PDAs), laptop computers, and mobile devices (e.g., cellular telephones, user equipment). Users of such applications can connect to a network (e.g., the Internet) as long as the user is within range of such a wireless communication technology.

Wireless communication technologies are handling increasing amount of data traffic volume. This is in part because mobile devices are becoming more sophisticated and are able to engage in more data-intensive activities such as displaying movies or playing video games. The network segment between the radio base station and the network edge is often termed as the mobile backhaul. This segment can become a bottleneck in wireless data communication if its capacity does not keep up with the increasing data traffic volume. Network service providers invest in the mobile backhaul, but this investment can incur large expenditures and diminishing returns.

DESCRIPTION OF EXAMPLE EMBODIMENTS

Overview

Certain embodiments disclose an apparatus that relays a data packet between a base station and a gateway, receives an offloading instruction message that includes a description of selected data packets to be offloaded at an Internet offloading router (IOR) to the Internet, inspects the data packet to determine if the data packet satisfies the description of selected data packets in the offloading instruction message, and if the data packet satisfies the description of selected data packets in the offloading instruction message, reformats the data packet and transmits the reformatted data packet to a server over the Internet.

Example Embodiments

The growth of mobile broadband data traffic is straining operator's existing backhaul and packet core elements. The majority of this traffic is either Internet-bound or sourced from the Internet, but is currently flowing through the operator's packet core and backhaul and is using traditional 3G deployment models. The operator's networks were designed primarily for voice calls to provide certain levels of service. However, the demand for bandwidth on operator's networks is not expected to slow. As mobile devices grow more sophisticated and the networks deliver increasingly more data to the mobile devices, the demand will continue to grow. One solution to this problem is offloading data from the operator's network onto the Internet to bypass parts of the backhaul and packet core. This disclosure describes systems and methods for offloading data traffic from an operator's communication network.

Offloading can occur at various segments in the communication network and different mechanisms can be used. The goal of offloading is to move data in an efficient way without sacrificing service, features, or security, and at the same time not increase capital and operational expenditures. Generally, the operator's network has a radio base station, a core network, and a network segment to connect the radio base station with the core network. This network segment between the radio base station and the network edge is often termed the backhaul network. This segment can be supported by microwave/UHF links and other point-to-point legacy links that were designed for voice calls, as well as newer technologies, such as Carrier Ethernet.

One focus area for improvement is offloading of some portion of data traffic to cost effectively sustain the backhaul load. Offloading is also called a breakout in some cases. At a high level, the goal of offloading is to place data on the most cost efficient route possible, without any significant increase in associated capital and operational cost. A mobile network operator's network is typically more expensive to provision and operate per megabyte of data than the Internet connection per megabyte because the mobile network is a specialized network that is optimized to provide mobile voice call service, which demands certain latency, audibility, roaming, and other characteristics that are not offered on a standard the Internet connection. However, not all data sent on the mobile network needs to pass through the mobile operator's network in order to service the mobile subscriber. In fact, about 95% of data traffic from user equipments is Internet bound and much of the Internet bound traffic does not need a gateway treatment. Therefore, in implementing offloading, it is desirable to place the Internet peering points closer to the radio base stations so the data traffic is offloaded to the Internet without straining the operator's network.

Data traffic can be offloaded at an offloading element. An offload element can include a gateway, a router, a server, and a switch. In a preferred embodiment, data traffic can be offloaded at an Internet Offloading Router (IOR), which is a router enhanced with an offloading capability. An IOR can be located between a radio base station and a gateway to route data packets between the radio base station and the gateway. In certain embodiments, an IOR can be physically separated from a gateway. In fact, an IOR can be geographically remote from the gateway and can communicate with the gateway over a long-distance communication network. In some embodiments, an IOR can be co-located with an eNodeB or can be integrated with an eNodeB to provide integrated offloading functionalities to the eNodeB. An IOR can inspect data packets passing through the IOR and divert data packets to the Internet if the packets satisfy offloading criteria. The IOR can communicate with a gateway to identify which data packets satisfy the offloading criteria. Once the IOR learns from the gateway that one or more data packets satisfy the offloading criteria, the IOR can offload data packets sharing the same properties as the data packet(s) identified by the gateway. For example, if the identified data packet traveled through a tunnel, the IOR can offload all data packets traveling through the same tunnel, if the gateway informs the IOR to do so.

By offloading data traffic at an IOR, the IOR can absorb a large amount of user data traffic from a backhaul network. Therefore, an IOR can reduce data traffic through the backhaul network, thereby reducing the number of gateways and their required data plane capacity. An IOR can operate independently of a mobility protocol and can perform gateway functionalities. But an IOR does not necessarily implement full gateway functionalities, and therefore an IOR can be simpler than an intelligent gateway that provides both mobility functionalities and Internet offloading functionalities. An IOR can operate without much knowledge about the communication network. In some embodiments, the only mobile knowledge maintained by an IOR can be a data plane tunneling format (e.g., the format of GTP, as defined by 3GPP). Because an IOR can operate based on IP standards features, an IOR can be independent of access technologies. For instance, in network implementing standards specified in 3GPP2 or WiMAX, an IOR can use an IETF generic routing encapsulation (GRE) to transfer data packets. Therefore, an IOR-based offloading scheme can be deployed in existing or future communication networks.

Oftentimes, an IOR can be placed close to radio base stations. Therefore, an IOR can provide a decentralized network address translation (NAT) function to communication networks and allow for efficient infrastructure scaling. Also, an IOR can help reduce data transfer cost by providing more cost-effective communication paths for eligible data packets. Furthermore, an IOR can allow network operators to separate the network's control plane and data plane for offloaded data, and scale each plane independently in a cost-effective manner.

Figure 1:
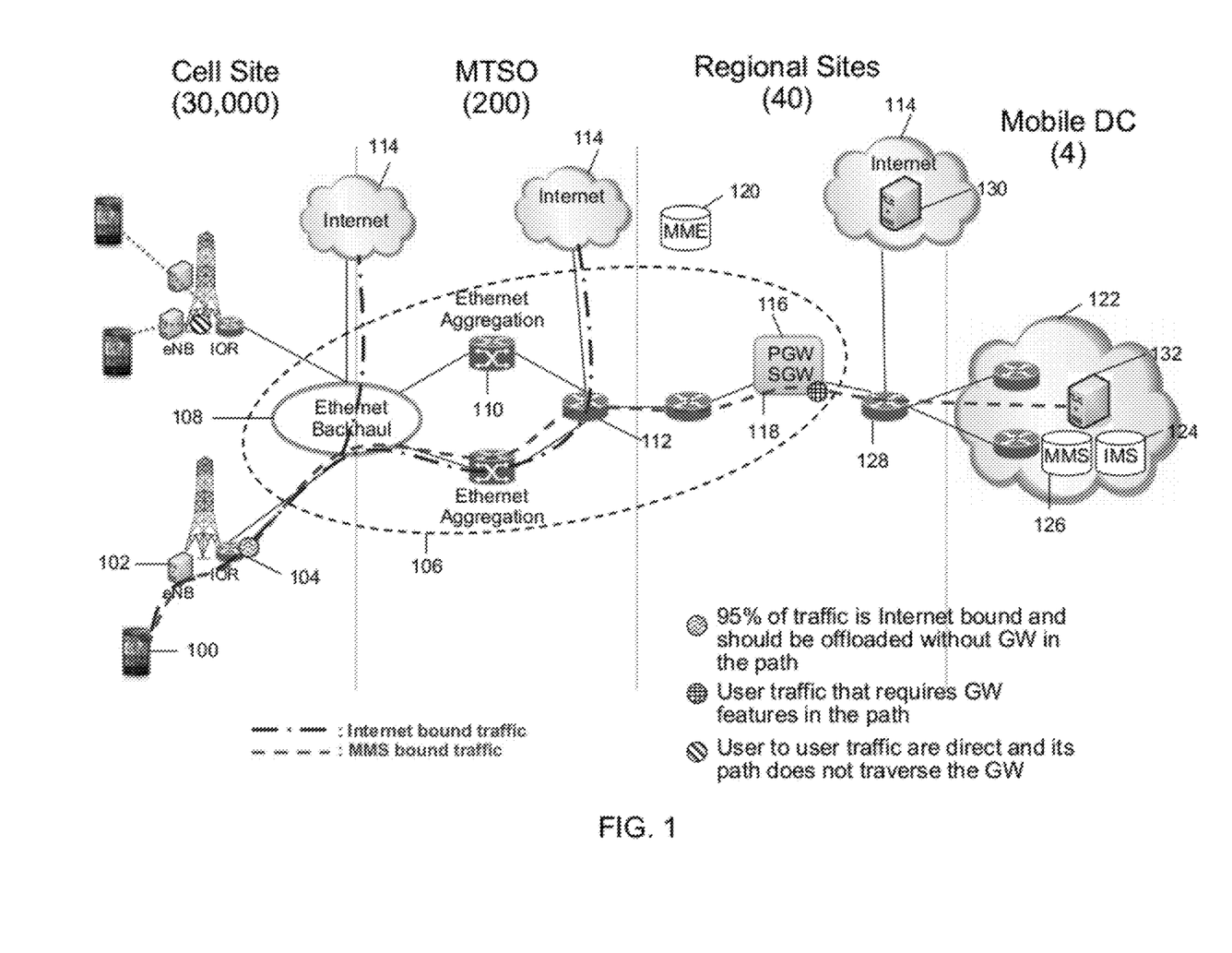
FIG. 1 illustrates communication networks including the Internet offloading router (IOR) in accordance with some embodiments.

FIG. 1 illustrates a communication network that includes an IOR in accordance with certain embodiments. FIG. 1 includes a user equipment (UE) 100, an evolved node B (eNodeB) transceiver 102, an Internet offload router (IOR) 104, an access network 106 including an Ethernet backhaul 108, an Ethernet aggregation point 110, and a router 112, the Internet 114, a packet data network gateway (PGW) 116, a serving gateway (SGW) 118, a mobility management entity (MME) 120, a core network 122 including an IP multimedia subsystem (IMS) 124 and a multimedia messaging service (MMS) 126, an Internet router 128, a server 130, and an application server 132. An eNodeB transceiver 102 is a long term evolution (LTE) network radio network component that connects to an Evolved UMTS Terrestrial Radio Access Network (E-UTRAN.)

The access network 106 can communicate with gateways including an access gateway and an anchor gateway. An access gateway can deliver data packets from and to a UE 100 within a geographical serving area. An access gateway can maintain session states and events, including tunnel endpoint identifications (TEID) of tunnels associated with a UE 100, the operating mode of a UE 100 (e.g., active or idle), and mobility information associated with a UE 100. An access gateway can also function as an anchor point for mobility. An access gateway can include a Serving General Packet Radio Service (GPRS) Support Node (SGSN) and an SGW 118. An anchor gateway, on the other hand, can be a point of exit and entry for data packet communication between a UE 100 and external packet data networks. An anchor gateway can include a Gateway General Packet Radio Service (GPRS) Support Node (GGSN) and a PGW 116. The access network 106 has an Ethernet backhaul 108 that aggregates and distributes data traffic from/to UEs 100. The Ethernet backhaul 108 can also communicate with the Internet 114 to directly route data to/from the Internet 114. The PGW 116 can communicate with the operator's core network 122, which can include an IP multimedia subsystem (IMS) 124 and a multimedia messaging service (MMS) 126.

The SGW 118 sits in the user plane where it forwards and routes packets to and from the eNodeB 102 and PGW 116. The SGW 118 serves as the local mobility anchor for inter-eNodeB 102 handover and for mobility between 3GPP networks. The SGW 118 routes and forwards user data packets, while also acting as the mobility anchor for the user plane during inter-eNodeB 102 handovers and as the anchor for mobility between LTE and other 3GPP technologies (e.g. terminating 3GPP S4 interface and relaying the traffic between 2G/3G systems and PGW 116). For idle state UEs 100, the SGW 118 terminates the down link data path and triggers paging when down link data arrives for the UE 100. The SGW 118 manages and stores UE contexts, e.g. parameters of the IP bearer service and network internal routing information. The SGW 118 also replicates the user traffic in case of lawful interception.

The PGW 116 acts as the interface between the 2G/3G/LTE network and other packet data networks, such as the Internet or SIP-based IMS networks (fixed and mobile). The PGW 116 serves as the anchor point for intra-3GPP network mobility, as well as mobility between 3GPP and non-3GPP technologies such as WiMAX and 3GPP2 standards (e.g. CDMA 1X and EVDO). The PGW 116 acts as the Policy and Charging Enforcement Function (PCEF), which manages Quality of Service (QoS), online/offline flow-based charging data generation, deep-packet inspection, and lawful intercept. The PGW 116 provides connectivity to the UE 100 to external packet data networks by being the point of exit and entry of traffic for the UE 100. A UE 100 may have simultaneous connectivity with more than one PGW 116 for accessing multiple packet data networks.

The MME 120 resides in the EPC control plane and manages session states, authentication, paging, mobility with 3GPP 2G/3G/LTE nodes, roaming, and other bearer management functions. The MME 120 can be a standalone element or integrated with other EPC elements, including the PGW 116 and the SGW 118, and Release 8 Serving GPRS Support Node (SGSN). The MME 120 can also be integrated with 2G/3G elements, such as the SGSN and GGSN. This integration allows mobility and session management interworking between 2G/3G and LTE/4G mobile networks.

MME 120 is a mobility unit residing in an LTE access network, controlling the operation of the LTE access network. The MME 120 is responsible for UE 100 tracking and paging procedures including retransmissions. The MME 120 handles the bearer activation/deactivation process, is responsible for choosing the SGW for a UE 100 at the initial attach and at time of an intra-LTE handover, authenticates the user by interacting with the HSS, generates and allocates temporary identities to UEs and terminates Non-Access Stratum (NAS) signaling, checks the authorization of the UE 100 to camp on the service provider's Public Land Mobile Network (PLMN), and enforces UE roaming restrictions. The MME 120 is the termination point in the network for ciphering/integrity protection for NAS signaling and handles the security key management. Lawful interception of signaling is also supported by the MME 120. The MME 120 provides the control plane function for mobility between LTE and 2G/3G access networks with an S3 interface terminating at the MME 120 from the SGSN. The MME 120 also terminates an S6a interface towards the home HSS for roaming UEs. The MME 120 could also be used in future "post-4G" wireless networks.

An IOR 104 can be located between the eNodeB 102 and the PGW 116. The eNodeB 102 can communicate with a UE 100 and function as an access point to the UE 100 to communicate with the network; the PGW 116 can be placed at the edge of an access network 106 and communicate with the core network 122. When a UE 100 initiates data communication with the core network 122, the eNodeB 102 serving the UE 100 can establish a tunnel with the SGW 118 and the SGW 118 can establish a tunnel with the PGW 116. The tunnel between the eNodeB 102 and the SGW 118 is called a radio network tunnel (ENB-SGW tunnel); the tunnel between the SGW 118 and the PGW 116 is called a core network tunnel (SGW-PGW tunnel). When the UE 100 transmits a data packet to the core network 122, the data packet can travel through the radio network tunnel and the core network tunnel consecutively. These tunnels can be established on a per-UE basis, on a per-address (e.g., IP address) basis, or a per-datablock or data flow basis, using a general packet radio service (GPRS) tunneling protocol (GTP). Each GTP tunnel can be identified using a tunnel endpoint identifier (TEID). In some embodiments, an IOR 104 can be configured to inspect data packets travelling over the radio network tunnel. The IOR 104 might not necessarily serve as a tunnel end point of the radio network tunnel; the IOR 104 can snoop into the radio network tunnel to determine if any of the data packets travelling over the radio network tunnel satisfies a certain criterion. The IOR 104 can also assist the PGW 116 to provide an integrated offloading service. For instance, the IOR 104 can collect accounting information and forward the information to the PGW 116 for further processing.

An IOR 104 can cooperate with the PGW 116 to provide an integrated offloading service. In some embodiments, the PGW 116 can maintain offloading criteria. The offloading criteria can describe the type of data packets that can be offloaded at the IOR 104. The offloading criteria can for example include one or more of the following factors: (1) the access point name (APN) configuration, (2) the traffic rules on the data packets, (3) the type of user equipment sending or receiving the data packets, (4) the packet data protocol (PDP) context or the EPS bearer, (5) the type of operating system running on the user equipment, and (6) the amount of data traffic from the user equipment. The PGW 116 can use the offloading criteria to select data packets to be offloaded.

Upon selecting data packets to offload to the Internet 114, the PGW 116 can determine an identification of the selected data packets. The identification of the selected data packets can be a header label of the selected data packets. This way, data packets with the specified header label can be offloaded to the Internet 114 before reaching the PGW 116. The header label can include an identification of a data path associated with the selected data packets. For example, the PGW 116 can decide to offload data packets that travel over the same data path as the selected data packets. The data path of a data packet can be a tunnel or a chain of tunnels, each of which can be identified using a TEID. As mentioned above, an uplink data packet can travel through two tunnels to reach the PGW 116 from the eNodeB 102: the radio network tunnel and the core network tunnel. Each of these tunnels has a tunnel identification: TEID_ES and TEID_SP, respectively. These TEIDs can fully identify the data path from the eNodeB 102 to the PGW 116. Therefore, the PGW 116 can identify these TEIDs to determine the identification of the selected data packets.

Figure 2:
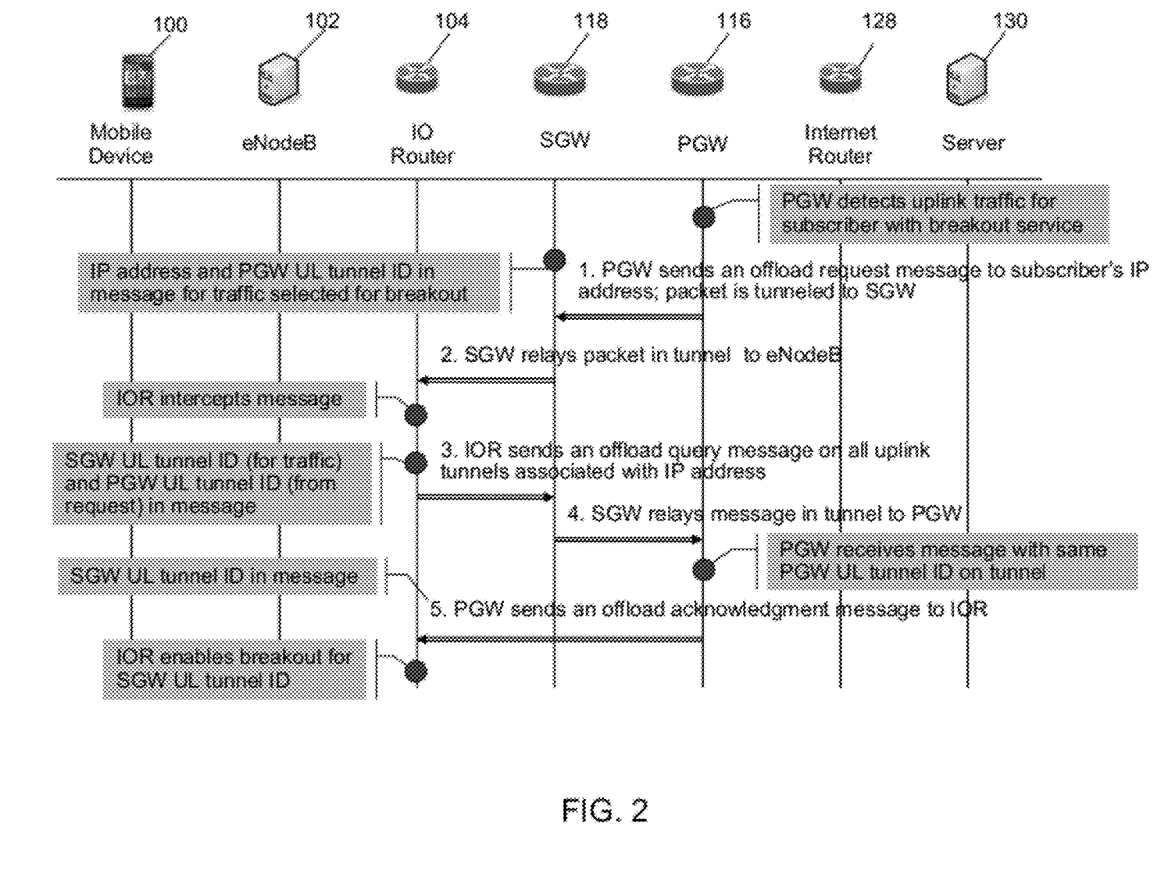
FIG. 2 is a flow diagram illustrating how a packet data network gateway (PGW) triggers an IOR to offload data traffic in accordance with some embodiments.
Figure 4:
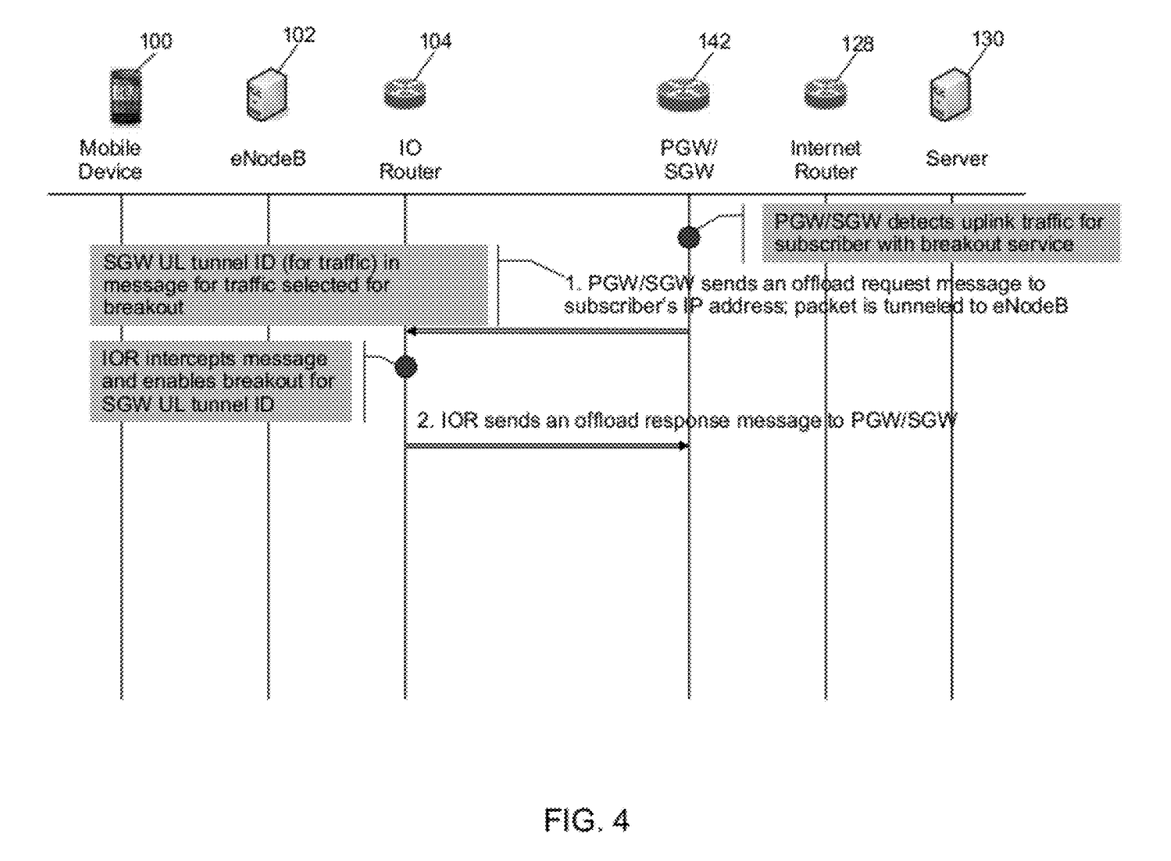
FIG. 4 is a flow diagram illustrating how an integrated gateway, including a PGW and a serving gateway (SGW), triggers an IOR to offload data traffic in a direct mode of network operation in accordance with some embodiments based on uplink data being received.
Figure 5:
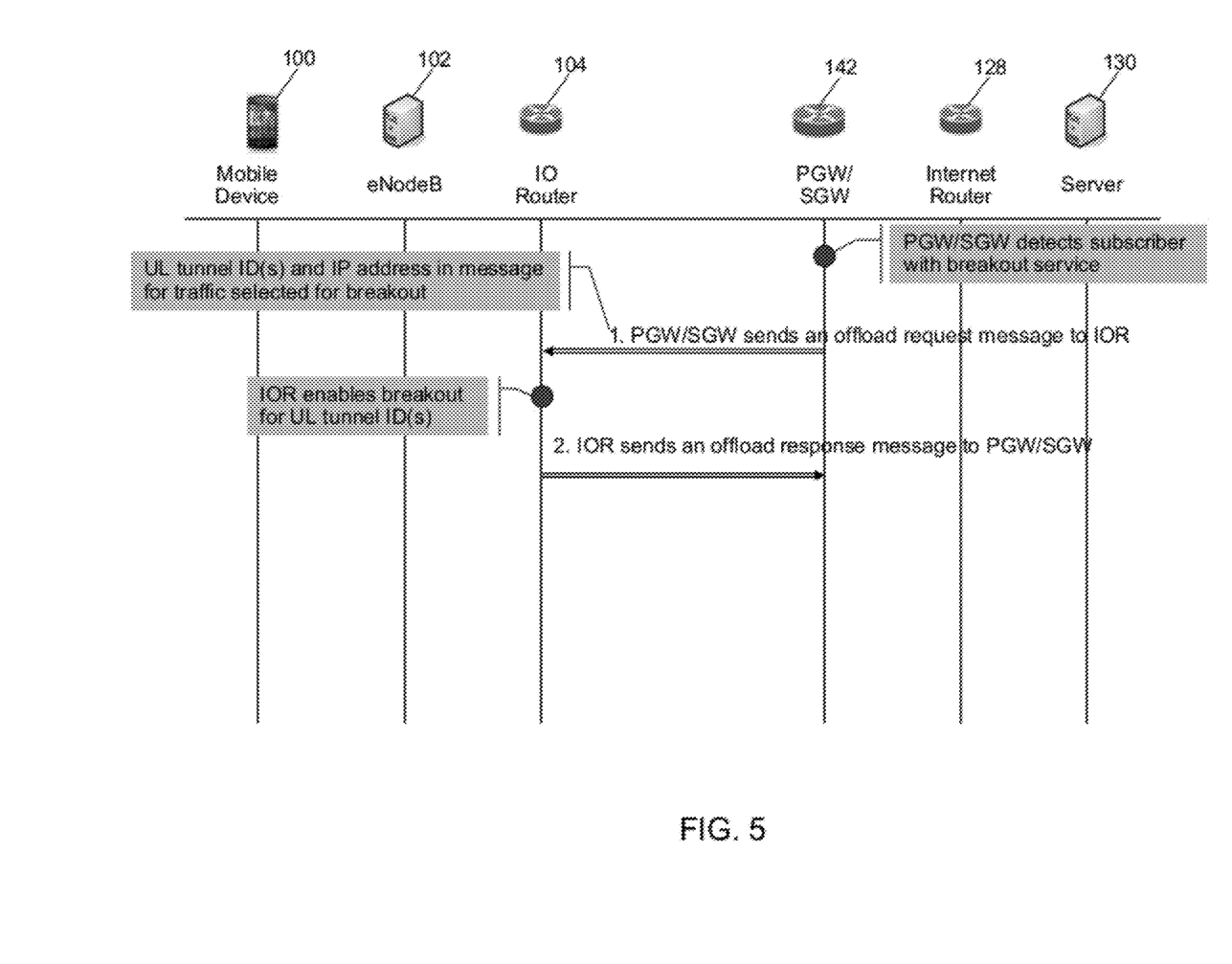
FIG. 5 is a flow diagram illustrating how an integrated gateway, in an inter process communication (IPC) mode, triggers an IOR to offload data traffic in accordance with some embodiments without requiring uplink data being received.

Upon selecting data packets to offload to the Internet 114, the PGW 116 can also determine which IOR 104 can offload the selected data packets to the Internet 114. Oftentimes, the PGW 116 offloads the selected data packets at the IOR 104 that serves the selected data traffic. However, in some embodiments, the PGW 116 might not be aware of which IOR 104 is serving the selected data packets. Therefore, the PGW 116 might discover the serving IOR 104 before offloading the selected data packets. The PGW 116 can discover the serving IOR 104 by sending a discovery message to the IP address from which the selected data traffic originated. The discovery message would travel through the serving IOR 104 to get to the origin of the selected data packet. However, once the discovery message arrives at the serving IOR 104, the serving IOR 104 can recognize the discovery message, absorb the discovery message, and respond to the discovery message to identify itself to the PGW 116. The PGW 116 can analyze the response from the IOR 104 to identify the serving IOR 104. FIGS. 2, 4, and 5 illustrate, in accordance with certain embodiments, how the PGW 116 discovers the identification of the selected data packets and the serving IOR 104. Once the PGW 116 discovers the identification of the selected data packets and the serving IOR 104, the PGW 116 can send an offloading instruction message to the serving IOR 104. The offloading instruction message can include the identification of selected data packets to be offloaded at the IOR. Note that the IOR can be any router on the path between eNodeB 102 and SGW 118. For example, the IOR can be router 112.

The IOR 104 can inspect data packets between the eNodeB 102 and the SGW 118 to determine if any of the data packets has the same identification as the identification of the selected data packets in the offloading instruction message. If one of the data packets has the same identification as the identification in the offloading instruction message, the IOR 104 can intercept the data packet, reformat the data packet to conform to the Internet communication channel, transmit the reformatted data packet to a server over the Internet. The IOR 104 can also receive data from a server directly over the Internet. In this case, the IOR 104 can encapsulate the received data in a data packet and transmit the data packet to the eNodeB 102. These high-level procedures illustrate that how the IOR 104 bridges the eNodeB 102 and the Internet to offload data packets.

FIG. 2 illustrates, in accordance with certain embodiments, how a PGW discovers the data path of a selected data packet and its serving IOR in a network configured in a relay mode. In the relay mode of network operation, a SGW 118 relays data packets between the eNodeB 102 and the PGW 116. In this mode, the PGW 116 might not be aware of which IOR 104 is serving each data packet or the ENB-SGW tunnel used by those packets. Likewise, the IOR 104 might not be aware of which PGW 116 is serving each data packet. When the PGW 116 selects a data packet that can be offloaded to the Internet according to the offloading criteria, the PGW 116 can initiate the following offloading procedures to offload data packets that would have travelled the same data path as the selected data packet.

In step 1, the PGW 116 sends an offload request message to the IP address that originally transmitted the detected data packet (i.e. UE 100). The offload request message is tunneled to the SGW 118 through the core network tunnel. The offload request message serves as a discovery message. The offload request message can include (1) a call correlation, (2) the IP address associated with the selected data packet, and (3) a discovery header that triggers the IOR 104 to absorb the offload request message and respond to identify itself to the PGW 116. The call correlation can be the identification of the core network tunnel (TEID_SP). The use of the call correlation is illustrated in steps 3-4.

In step 2, the SGW 118 sends the offload request message through the radio network tunnel. This radio network tunnel starts from the SGW 118 and ends at the eNodeB 102 that serves the IP address associated with the selected packet. This eNodeB 102 is called the serving eNodeB 102. Any data packets traveling through the radio network tunnel from the SGW 118 to the serving eNodeB 102 passes through the IOR 104 that also serves the selected data packet. This IOR 104 is called the serving IOR 104. Normally, a tunnel is set up in such a way that data packets traveling through the tunnel reaches the end of the tunnel. However, an IOR 104 is a special device that can snoop into the radio network tunnel to inspect data packets traveling over the tunnel and to intercept those data packets. The serving IOR 104 can inspect the downlink data packets in the radio network tunnel to determine if one of the downlink data packets includes the offload request message. The serving IOR 104 can detect the offload request message by determining whether a data packet includes a discovery header. If the IOR 104 detects the offload request message in a data packet, the IOR 104 can intercept the data packet instead of relaying it to the serving eNodeB 102 and initiate procedures for identifying itself to the PGW 116.

In step 3, the IOR 104 responds to the offload request message by sending an offload query message to the serving PGW 116. The offload query message can include (1) the identification of the radio network tunnel (TEID_ES) over which the offload query message travels through and (2) the verification code in the offload request message. As mentioned earlier, the IOR 104 might not know which PGW 116 sent the offload request message. To ensure that the serving PGW 116 receives the offload query message, the IOR 104 can broadcast the offload query message on all uplink radio network tunnels associated with the IP address in the offload request message to account for overlapping IP addresses. This way, at least one of the offload query messages can reach the SGW 118 that is in communication with the serving PGW 116.

In step 4, the SGW 118 receives one of the broadcasted offload query messages on the radio network tunnel and SGWs 118, in turn, relays the received offload query message to the PGW 116 using the core network tunnel that is associated with the radio network tunnel the query message was received on. This ensures that the serving PGW 116 can receive the offload query message. Other PGWs serving the same IP-address may receive the query message as well, however the verification code will not match for them and hence they will ignore the query, as explained further below. The serving PGW 116 can keep track of over which core network tunnel each offload query message is received. This receiving core network tunnel can be identified using a receiving tunnel identification, which can be a TEID. Upon receiving the offload query message, the serving PGW 116 retrieves the verification code from the offload query message and determines if the receiving tunnel identification matches the verification code. If the receiving tunnel identification and the verification code do not match, the received offload query message either (1) is not a response to the offload request message that the serving PGW 116 sent in step 1 or (2) is a response to the offload request message that the serving PGW 116 sent, but did not travel the data path that the selected data packet traveled. In this case, the serving PGW 116 can ignore the received offload query message and wait for a new offload query message.

If the receiving tunnel identification and the call correlation do match, then the PGW 116 can ensure that (1) the received offload query message is a response to the offload request message that the serving PGW 116 sent in step 1 and (2) the received offload query message also traveled the data path that the selected data packet traveled. Therefore, the serving PGW 116 can acknowledge that the serving IOR 104 sent the offload query message and that the identification of the radio network tunnel (TEID_ES) in the offload query message identifies the radio network tunnel for the selected data packet. Now, the serving PGW 116 has identified (1) the data path of the selected data packet and (2) the serving IOR 104. Therefore, the serving PGW 116 can send an offloading instruction message to the serving IOR 104.

In step 5, the serving PGW 116 sends an offload acknowledgment message to the serving IOR 104. The offload acknowledgment message can serve as an offloading instruction message. The serving PGW 116 sends the offload acknowledgment message directly to the IOR 104, which identified itself to PGW 116 in the query message. The offload acknowledgment message can include the TEID_ES that was included in the offload query message. By sending the TEID_ES in the offload acknowledgment message, the serving PGW 116 can notify the serving IOR 104 to offload data packets that would have traveled over the TEID_ES. Once the serving IOR 104 receives the offload acknowledgment message from the serving PGW 116, the IOR 104 inspects the offload acknowledgment message to retrieve the TEID_ES. Then the IOR 104 configures itself to offload data packets that would have traveled over the radio network tunnel identified by the TEID_ES.

Figure 3:
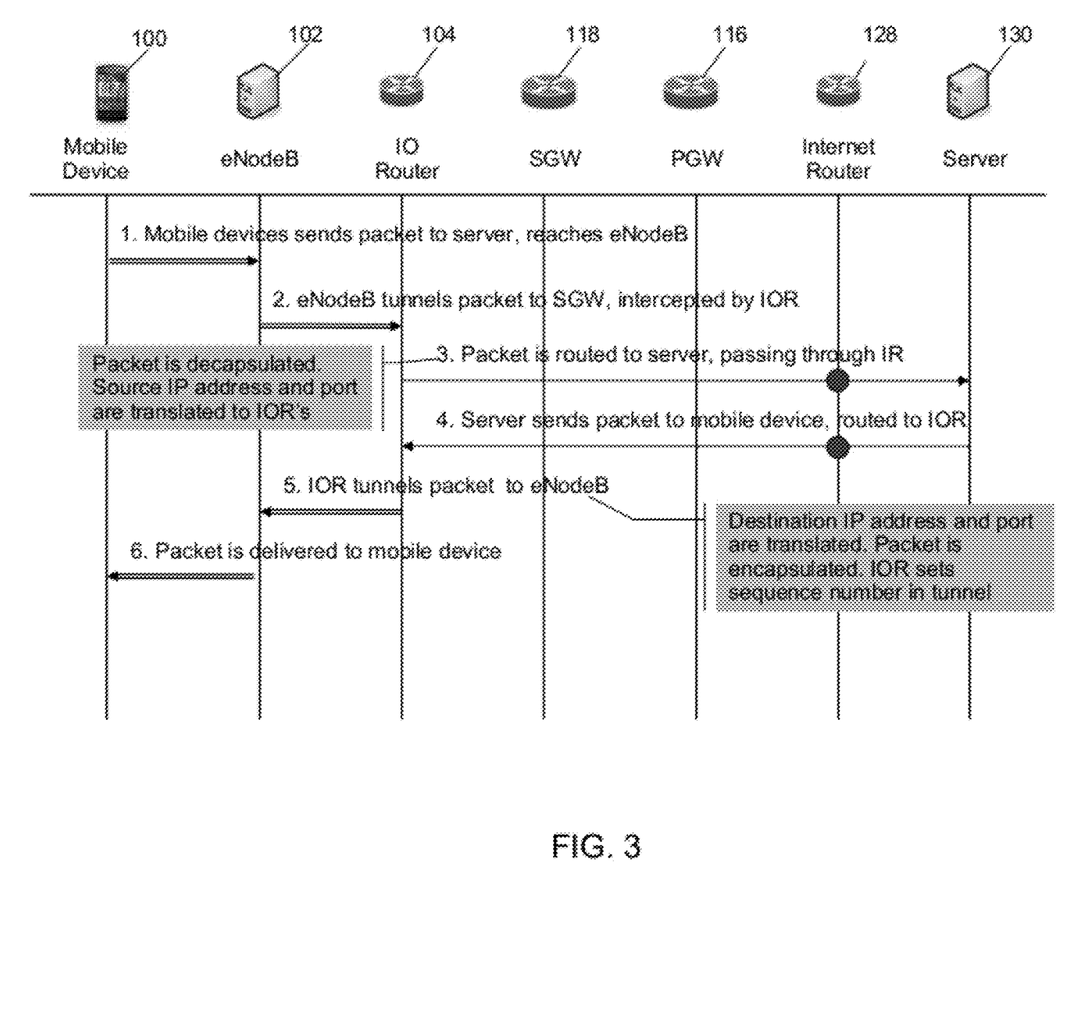
FIG. 3 is a flow diagram illustrating how an IOR offloads data packets in accordance with some embodiments that include one or more intermediate elements.

FIG. 3 illustrates, in accordance with certain embodiments, how an IOR relays selected data packets to and from the Internet. Steps 1-3 show how the IOR 104 offloads the selected data packets to the Internet; steps 4-6 show how the IOR 104 receives data packets directly from the Internet. In step 1, the user equipment 100 sends data packets to the server 130. These data packets reach the eNodeB 102 and the eNodeB 102 transmits the received data packets to the SGW 118 over a radio network tunnel, as in a normal mode of operation. In step 2, the IOR 104 inspects the headers of data packets in the radio network tunnel and intercepts data packets with headers satisfying the identification of the selected packets in the offloading instruction message. Then, the IOR 104 can reformat the data packet and transmit the reformatted data packet to the Internet. The reformatting can include de-capsulating the intercepted data packets and translating the source IP address and port information to the IOR's IP address and port information (i.e., network address translation.) In step 3, the IOR 104 can directly send the de-capsulated, address-translated data to the server 130 over the Internet router 128, completing the data transmission from the user equipment 100 to the server 130 over the Internet.

In step 4, the server 130 wants to send data packets to the user equipment 100. The server 130 can directly send the data to the IOR 104 over the Internet router 128. Upon receiving the data from the server 130, the IOR 104 can translate the IP address and the port information and encapsulate the received data into a packetized form. The IOR 104 can also set the sequence number in tunnel. In step 5, the IOR 104 can tunnel the packetized data to the corresponding eNodeB 102, and the eNodeB 102 can relay the data packets to the user equipment 100 in step 6, completing the data transmission from the server 130 to the user equipment 100. This show that an IOR 104 can relieve strain on the backhaul network.

In some embodiments, an anchor gateway and an access gateway can be co-located or can be integrated into an integrated gateway in order to provide an integrated service to subscribers. Therefore, any data traffic received by the access gateway can be directly transferred to the anchor gateway. This is called a direct mode of network operation. As in the relay mode, when the anchor gateway wants to offload selected data packets, the anchor gateway can determine two pieces of information: (1) the data path of the selected data packet and (2) the IOR serving the data packet. In the direct mode, the data path between the anchor gateway and the access gateway is static: connection between the anchor gateway and the access gateway does not change over time. Therefore, the anchor gateway might not have to identify the data path between the anchor gateway and the access gateway. Also, the anchor gateway can communicate with the access gateway to learn which radio network tunnel each data packet travels through. Therefore, in the direct mode of operation, the anchor gateway can be aware of the radio network tunnel of a selected data packet. Thus, in the direct mode, the anchor gateway might not have to discover the radio network tunnel of the selected data packet as in the relay mode.

FIG. 4 illustrates, in accordance with certain embodiments, how an integrated gateway discovers an IOR serving the selected data packet in the direct mode of operation. A PGW/SGW 142 is a particular instance of an integrated gateway. A PGW/SGW 142 can provide both access gateway functionalities and anchor gateway functionalities. Although FIG. 4 illustrates the procedure using a PGW/SGW 142, the same procedure can be used to accommodate co-located access gateway and anchor gateway. The PGW/SGW 142 can select data packets for offloading. Upon selection, the PGW/SGW 142 can send an offload request message to the IP address associated with the selected data packet. The offload request message can include (1) the IP address associated with the selected data packet, (2) a discovery header that triggers the IOR 104 to absorb the offload request message and respond to identify itself to the PGW 116, and (3) the identification of the radio network tunnel (TEID_ES) over which the selected data packets travelled. In the direct mode, the offload request message can serve as an offloading instruction message and a discovery message.

The PGW/SGW 142 can tunnel the offload request message to the eNodeB 102 serving the IP address associated with the selected data packet. On its path to the serving eNodeB 102, the offload request message can pass through the serving IOR 104. When the serving IOR 104 detects the offload request message by detecting the discovery header, the IOR 104 can intercept the offload request message and configure itself to offload data packets traveling over the radio network tunnel identified by the TEID_ES. Then, in step 2, the IOR 104 can send an offloading response message to the PGW/SGW 142 using the radio network tunnel identified by the TEID_ES. Now, the IOR 104 is ready to offload selected data packets. The serving IOR 104 relays the selected data packets to and from the Internet using the procedure similar to the procedure illustrated in FIG. 3.

In some embodiments, the communication network is static: connections between network nodes do not change over time. Therefore, each network node can maintain how network nodes are connected. In this case, the communication network is said to operate in an inter-process communication (IPC) mode. As in the relay mode, when the anchor gateway decides to offload data packets, the anchor gateway can determine two pieces of information: (1) the data path from the eNodeB 102 to the PGW 116 over which the data packet travels and (2) the IOR 104 serving the data packet. In the IPC mode, the gateways can be aware of both pieces of information even before receiving any packets. The data path between the eNodeB 102 and the PGW 116 can be fixed and known to both eNodeB 102 and the PGW 116; the IOR 104 serving the data packets can be also fixed and known to the PGW 116. Therefore, in order to set up the network for offloading, the anchor gateway might not need to find the data path of selected data packets and the serving IOR 104 but can send an offload request directly to the IOR.

FIG. 5 illustrates, in accordance with certain embodiments, how an integrated gateway sets up the network for offloading in the IPC mode of operation. Although FIG. 5 illustrates the procedure using a PGW/SGW 142, a substantially similar procedure can be used to accommodate a PGW and a SGW operating independently. Upon selecting data packets to be offloaded, in step 1, the PGW/SGW 142 sends an offload request message to the serving IOR 104. The offload request message can include (1) the IP address from which the detected data packets originated or will originate and (2) the identification of the radio network tunnel. In the IPC mode, the offload request message can serve as an offloading instruction message. Upon receiving the offload request message, the serving IOR 104 can configure itself to offload data packets that would have travelled over the tunnel identified by the received radio network tunnel identification. In step 2, the serving IOR 104 can send an offloading response message to the PGW/SGW 142 to signal that the selected data packets will be offloaded. The serving IOR 104 can relay the selected data packets to and from the Internet using the procedure similar to the procedure illustrated in FIG. 3.

In all of the modes, the IOR 104 can support charging operations. The IOR 104 can gather the packet and byte counters by monitoring the data traffic to and from the Internet, and send the gathered packet and byte counters to the PGW 116 or PGW/SGW 142. The PGW 116 or PGW/SGW 142 can re-format the packet and byte counters into the charging data records (CDR) and send the CDR to an offline charging server. In the IPC mode, the IOR 104 can also support lawful intercept.

In some cases, a user equipment with offloaded data traffic can move to a new location and can desire a handover from the serving IOR to a new IOR. In some embodiments, the data traffic being offloaded at the serving IOR can be re-routed to be offloaded at the new IOR. The PGW can maintain handover criteria to determine whether to handover the offloaded data traffic from the serving IOR to a new IOR. The handover criteria can include (1) the PGW detects an handover trigger event (e.g., location change, an access gateway change) via mobility signaling, (2) the PGW receives a data traffic that should have been offloaded at the serving IOR, and (3) the PGW detects a data traffic identified by a new IOR. Once the PGW decides to handover the offloaded data traffic, the PGW can send an offloading halt message to the serving IOR in order to stop the offloading at the serving IOR. Then the PGW can execute the IOR handover procedure with the new IOR. The IOR handover procedure includes (1) discovering an identification of the data traffic to be offloaded and (2) sending a handover instruction message to the new IOR. The handover instruction message includes at least the identification of the data traffic to be offloaded. In certain embodiments, the handover instruction message can include substantially the same information as in the offloading instruction message. One skilled in the art can easily modify the steps illustrated in FIGS. 2, 4, and 5 to perform the IOR handover procedure with the new IOR. In other embodiments, when the PGW detects IOR handover conditions, the PGW can trigger the IORs to establish a tunnel between the serving IOR and the new IOR so that any data traffic through the serving IOR can be tunneled to the new IOR.

IOR, User Equipment, and Gateway

Figure 6:
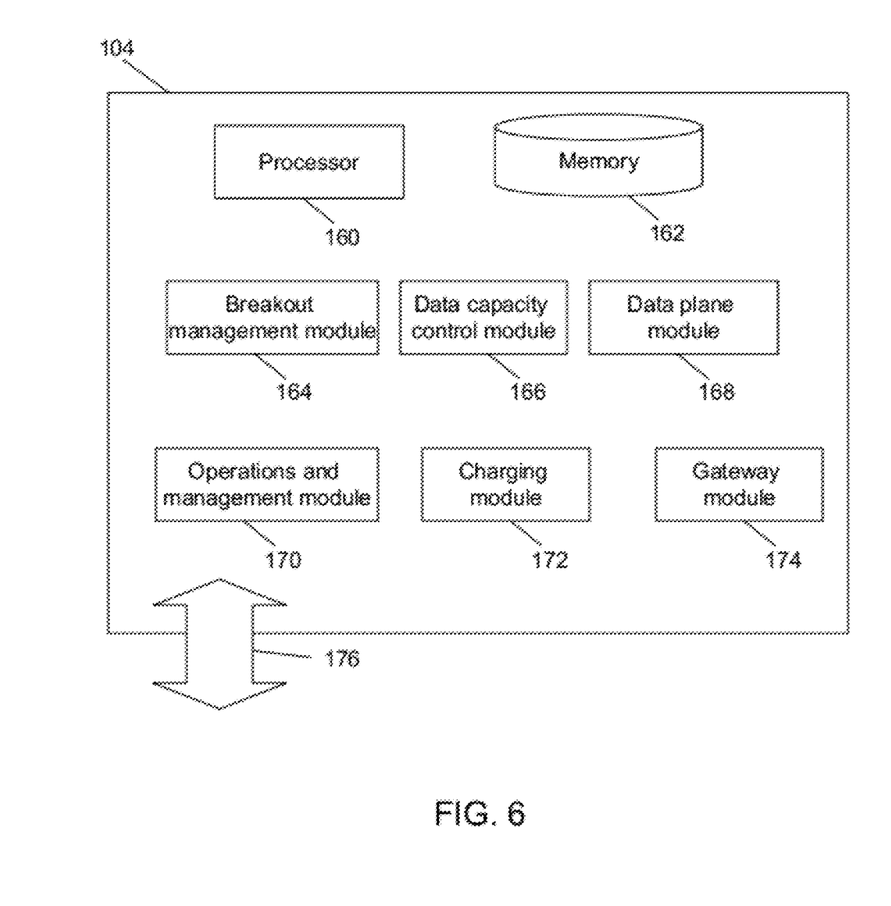
FIG. 6 illustrates a logical view of an IOR in accordance with certain embodiments.

FIG. 6 illustrates a logical view of an IOR in accordance with certain embodiments. An IOR 104 can be implemented as a router; an IOR can also be implemented as a mobility edge router. An IOR 104 can include a processor 160, a memory 162, an offloading management module 164, a data capacity control module 166, a data plane module 168, an operations and management module 170, a charging module 172, a gateway module 174, and an interface 176.

The offloading management module 164 can communicate with an anchor gateway to provide offloading services to subscribers. The offloading management module 164 can inspect downlink data traffic to determine if the downlink data traffic includes an offload request message from an anchor gateway. If it does, the offloading management module 164 can intercept the offload request message and respond to the offload request message by sending an offload query message to the anchor gateway in order to identify itself to the anchor gateway. The offloading management module 164 can send the response on all uplink tunnels associated with the IP address included in the offload request message. This way, at least one of the responses will get to the anchor gateway that sent the offload request message. Once the offloading management module 164 receives an offloading instruction message from the anchor gateway, the module 164 can offload selected data packets identified by the offloading instruction message. The offloading instruction message can include a description of the selected data packets. The description of the selected data packets can be the identification of the tunnel that the selected data packets travel through. The offloading management module 164 can inspect data packets to determine if the data packet satisfies the description of selected data packets in the offloading instruction message, and if it does, the module can reformat the data packet and transmit the reformatted data packet to a server over the Internet.

The data capacity control module 166 can monitor and control the amount of data traffic served by the IOR 104. The data capacity control module 166 can count the number of sessions established at the IOR 104, monitor the control plane/data plane signaling rate or latencies, and monitor the data throughput at the IOR 104.

The data plane module 168 can process user data communicated through the IOR 104. The data plane module 168 can provide a network address translation (NAT) functionality and variations of the NAT functionality such as a network address port translation (NAPT) functionality, a NAT64 functionality that translates IPv6 packets to IPv4 packets and vice versa, and an access control using an access control list (ACL) or a source address check. The data plane module 168 can implement Quality of Service (QoS) policies with differentiated service code point (DSCP) markings. The data plane module 168 can also control the amount of network resources assigned to each user equipment to provide a specified data rate. Furthermore, the data plane module 168 can establish a GPRS tunneling protocol tunnels with other network devices such as an eNodeB or an access gateway, provide accounting services for the data traffic handled at the IOR 104, detect idling user equipment and release network resources assigned to idling user equipment, and select data paths for offloaded data traffic.

The operations and management (OAM) module 170 manages the operations of the IOR 104 in a communication network. The OAM module 170 can provide a stateless recovery capability to the IOR 104, redundant features to guard against potential failures, and a management information base (MIB). The charging module 172 can assist an anchor gateway in monitoring the amount of data traffic through the IOR. The charging module 172 can monitor the data traffic through the IOR 104 to provide the packet and byte counters to an anchor gateway.

The gateway module 174 can provide anchor gateway functionalities. The gateway module 174 does not necessarily implement the full set of anchor gateway functionalities. The gateway module 174 can filter a packet in a per-user basis by maintaining an access control list. This can enable a deep packet inspection at an IOR 104. The gateway module 174 can also provide lawful interception capability. The gateway module 174 can further provide transport level packet marking in the uplink and downlink data traffic. The transport level packet marking can include setting the differentiated service (DiffServ) code point based on the quality control index (QCI) of the associated EPS bearer. The gateway module 174 can provide an accounting scheme for inter-operator charging. For example, for a GPRS tunneling protocol (GTP) based S5/S8 interface, the gateway module 174 can generate accounting data per user equipment and bearer. The gateway module 174 can provide packet screening functionality to the IOR 104. The packet screening functionality can include provisioning that a user equipment uses the IPv4 address and/or IPv6-prefix that was assigned to the user equipment.

The gateway module 174 can also provide access gateway functionalities, but the gateway module 174 does not necessarily implement the full set of access gateway functionalities. The gateway module 174 can serve as a local mobility anchor point for inter-eNodeB handover and send one or more "end marker" to the source eNodeB, source access gateway, or the source radio network controller immediately after switching the path during inter-eNodeB and/or inter-radio access technology (RAT) handover. This can assist the reordering function in eNodeB. The gateway module 174 can also provide mobility anchoring for inter-3GPP mobility, terminating an S4 interface and relaying data traffic between 2G/3G system and the anchor gateway. The gateway module 174 can further buffer ECM-IDLE mode downlink packet and initiate network triggered service request procedure. The gateway module 174 can provide lawful interception services and packet routing and forwarding services.

These modules can be implemented in software, which may be stored in a memory 162. The memory 162 can include a computer readable medium, a programmable read only memory (PROM), or flash memory. The software can run on a processor 160 capable of executing computer instructions or computer code. The modules may also be implemented in hardware using an application specific integrated circuit (ASIC), programmable logic array (PLA), field programmable gate array (FPGA), or any other integrated circuit.

An interface 176 can provide an input and/or output mechanism to communicate with other network devices. The interface 176 can enable communication with other network devices, including an eNodeB, an anchor gateway, an access gateway, and the Internet router, to send and receive data. The interface 176 can be implemented in hardware to send and receive signals in a variety of mediums, such as optical, copper, and wireless, and in a number of different protocols some of which may be non-transient.

In certain embodiments, the IOR can maintain an access control list (ACL) for offloading. Each entry in the ACL can be an IP address of the selected data packets to be offloaded at the IOR. The IOR can inspect data packets to determine whether one of the data packets originated from the IP address that is listed in the ACL. If the IOR detects such a data packet, the IOR can intercept the data packet and offload the data packet to the Internet instead of transmitting the data packet to the gateway.

The IOR described above can be implemented on a router. A router can include functional components organized as a control plane and a data plane. The control plane includes the functional components used to manage the traffic forwarding features of the router. These components include routing protocols, configuration information and other similar functions that determine the destinations of data packets based on information other than that included within the packets. The data plane, on the other hand, includes functional components used to perform forwarding operations for the packets.

For a single processor router, the control and data planes are typically implemented on the single processor. However, for some high performance routers, these planes are implemented within separate devices of the router. For example, the control plane may be implemented in a supervisor processor, whereas the data plane may be implemented within a hardware-assist device, such as a co-processor or a forwarding processor. In other words, the data plane can be implemented in hardware that is separate from the hardware that implements the control plane.

The control plane can be more complex than the data plane because the software operating on the supervisor processor deals with protocol messaging and other logic in order to perform in the communication network. Therefore, failures are more likely to occur in the supervisor processor when executing such complicated code. In order to ensure high availability in a router, it is desirable to configure the router to split the operations of the control plane and the data plane. In this way, if a failure arises with the control plane that impacts the software executing on the supervisor processor, the data plane can continue to operate without issue. Restarting of control plane software may be necessary because of a failure with a routing protocol component or a software upgrade to that component. A router that is configured to enable its data plane to continue packet forwarding operations during restart of the control plane software is referred to as a non-stop forwarding capable router.

While the structure of the router can differ depending on the implementation, the router can include a number of line cards that are communicatively coupled to a forwarding engine and a processor via a data bus and a result bus. The line cards can include a number of port processors, which are controlled by port processor controllers. The forwarding engine and the processor, in some embodiments, can also be communicatively coupled to one another by a communications link.

When a packet is received, at the router, the packet is identified and analyzed by a router element. The packet (or some or all of its control information) when received by a port processor is sent from the port processor to one or more of those devices coupled to data bus (e.g., another of port processor, forwarding engine and/or processor). Handling of the packet can be determined by forwarding engine. For example, forwarding engine may determine that the packet should be forwarded to one or more of port processors. This can be accomplished by indicating to corresponding port processor controllers that the copy of the packet held in the given port processors should be forwarded to the indicated port processors.

In the foregoing process, network security information can be included in a frame sourced by routing in a number of ways. For example, forwarding engine can be used to detect the need for the inclusion of network security information in the packet, and the processor can be called into service to provide the requisite network security information. This network security information can be included in the packet during the transfer of the packet's contents from one of port processors to another of port processors, by processor providing the requisite information directly, or via forwarding engine, for example. The assembled packet at the receiving port processors can thus be modified to include the requisite network security information. This processing of the packet to include security information can include encryption of some or all of the packet's information, the addition of a digital signature or some other information or processing capable of securing the packet.

The user equipment described above can communicate with a plurality of radio access networks using a plurality of access technologies and with wired communication networks. The user equipment can be a smart phone offering advanced capabilities such as word processing, web browsing, gaming, e-book capabilities, an operating system, and a full keyboard. The user equipment may run an operating system such as Symbian OS, iPhone OS, RIM's Blackberry, Windows Mobile, Linux, Palm WebOS, and Android. The screen may be a touch screen that can be used to input data to the mobile device and the screen can be used instead of the full keyboard. The user equipment may have the capability to run applications or communicate with applications that are provided by servers in the communication network. The user equipment can receive updates and other information from these applications on the network.

The user equipment also encompasses many other devices such as televisions (TVs), video projectors, set-top boxes or set-top units, digital video recorders (DVR), computers, netbooks, laptops, and any other audio/visual equipment that can communicate with a network. The user equipment can also keep global positioning coordinates, profile information, or other location information in its stack or memory. The user equipment can have a memory such as a computer readable medium, flash memory, a magnetic disk drive, an optical drive, a programmable read-only memory (PROM), and/or a read-only memory (ROM). The user equipment can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

The gateway described above can be implemented in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PGW), a mobility management entity (MME), a mobility access gateway (MAG), an HRPD serving gateway (HSGW), a local mobility anchor (LMA), a packet data serving node (PDSN), a foreign agent (FA), and/or home agent (HA).

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintain traffic management for the mobile node. The offload gateway can be implemented as any combination of the following including an xGSN, an xGW, an xGW-SGW 118, and an xGW-PGW 116.

Figure 7:
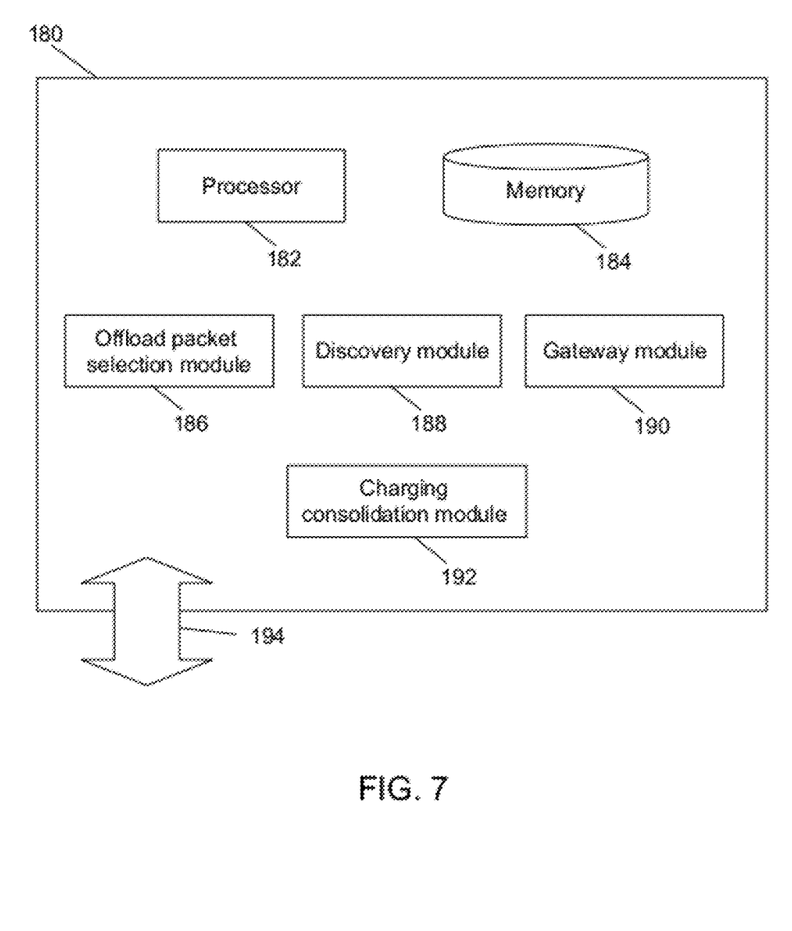
FIG. 7 illustrates a logical view of a gateway in accordance with certain embodiments.

FIG. 7 illustrates a logical view of a gateway in accordance with certain embodiments. A gateway 180 can include a processor 182, a memory 184, an offload packet selection module 186, a discovery module 188, a gateway module 190, a charging consolidation module 192, and an interface 194.

The offload packet selection module 186 can select data packets that can be offloaded at an IOR. To select the data packets to be offloaded, the module 186 can use offloading criteria. The offloading criteria describe the type of data packets that can be offloaded at an IOR. The offloading criteria can be maintained by the module 186.

Once the offload packet selection module 186 selects the data packets to be offloaded, the discovery module 188 can determine the identification of the selected data packets and the IOR that is serving the selected data packets. The discovery module 188 can send a discovery message to the IP address associated with the selected data packets and analyze the response sent by the IORs to determine the identification of the selected data packets and the serving IOR.

The gateway module 190 can provide gateway functionalities. The gateway module can instantiate an anchor gateway such as a PGW and a GGSN, an access gateway such as a SGW and a SGSN, or an integrated gateway such as a PGW/SGW and a GGSN/SGSN.

The charging consolidation module 192 can collect charging information related to the data traffic offloaded at the IOR and consolidate the offload traffic charging information with normal traffic charging information so that the offloading operations are transparent to charging functions. The charging consolidation module 192 receives offload traffic charging information from one or more IORs, consolidate the offload traffic charging information with the normal traffic charging information, and transmit the consolidated charging information to charging functions. The charging consolidation module 192 can use the charging criteria or charging data locally available at the gateway to consolidate the offload traffic charging information with the normal traffic charging information.

The offload packet selection module 186 and the discovery module 188 can be implemented in software, which may be stored in memory 184. The memory 184 can include a computer readable medium, a programmable read only memory (PROM), or flash memory. The software can run on a processor 182 capable of executing computer instructions or computer code. The modules may also be implemented in hardware using an application specific integrated circuit (ASIC), programmable logic array (PLA), field programmable gate array (FPGA), or any other integrated circuit.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, an IOR can be co-located or integrated with an eNodeB.

We claim:
1. A method comprising:
receiving, at an offloading element, a discovery message from a gateway;
in response to the discovery message, sending, to the gateway, an offload query message including an indication that the offloading element serves data packets selected by the gateway to be offloaded;
receiving an offloading instruction message from the gateway, wherein the offloading instruction message includes an identification of the selected packets to be offloaded at the offloading element to an Internet;
inspecting a first packet to determine that an identification of the first packet matches the identification of the selected packets in the offloading instruction message;
de-capsulating the first packet;

translating a network address in the de-capsulated first packet; and offloading the de-capsulated and network-address-translated first packet to a server.

2. The method of claim 1, further comprising receiving data from the server over the Internet instead of over the gateway, encapsulating the data into a packetized form, translating a network address associated with the data, and transmitting the encapsulated data to a base station.

3. The method of claim 1, wherein the first packet travels over a tunnel established between a base station and an access gateway and the offloading element inspects the first packet by snooping into the tunnel.

4. The method of claim 1, further comprising inspecting a second packet to determine if the second packet includes the offloading instruction message.

5. The method of claim 1, wherein the identification of the selected packets in the offloading instruction message includes a tunnel endpoint identifier (TEID) of a tunnel associated with the selected packets.

6. The method of claim 1, further comprising:
determining at the gateway that a second packet, which is determined to be offloaded at the offloading element, be handed over to a new offloading element so that the second packet is offloaded at the new offloading element;
sending an offloading halt message to the offloading element to stop offloading the second packet at the offloading element; and
sending a handover instruction message to the new offloading element to offload the second data packet at the new offloading element, wherein the handover instruction message includes an identification of the second packet.

7. The method of claim 1,
wherein the offload query message includes an identification of a data path over which the discovery message was received in order to provide the identification of the selected data packets.

8. The method of claim 1, further comprising:
receiving at the gateway the offload query message over a tunnel, wherein the tunnel is identified by a TEID and the offload query message includes a call correlation;
retrieving the call correlation from the offload query message and determining that the call correlation matches the TEID of the tunnel, and
sending the offloading instruction message to the offloading element.

9. The method of claim 1, further comprising sending the discovery message by the gateway to an Internet protocol (IP) address associated with the selected packets.

10. The method of claim 1, wherein the offload query message is sent on all tunnels associated with the selected packets so that the gateway receives at least one offload query message and discovers that the offloading element is serving the selected packets.

11. A router, physically separated from a gateway, comprising:
an interface that is configured to provide communication with a base station, the gateway, and an Internet, to receive a first packet from the base station and transmit the first packet to the gateway, and further configured to receive a second packet from the gateway and transmit the second packet to the base station;
a module that is configured to:
receive a discovery message from the gateway,
send, to the gateway, an offload query message including an indication that the router serves packets selected by the gateway to be offloaded,
receive an offloading instruction message from the gateway, the offloading instruction message including an identification of the selected packets to be offloaded to the Internet,
inspect the first packet to determine that an identification of the first packet matches the identification of the selected packets in the offloading instruction message,
de-capsulate the first packet,
translate a network address in the de-capsulated first packet, and
offload the de-capsulated and network-address-translated first packet to the Internet.

12. The router of claim 11, wherein the identification of the selected packets in the offloading instruction message includes a TEID of a tunnel associated with the selected packets.

13. The router of claim 11, wherein the offload query message includes a call correlation that is used at the gateway to verify that the offload query message is sent by the router.

14. The router of claim 11, wherein the offload query message is sent on all tunnels associated with the selected packets so that the gateway receives at least one offload query message.

15. The router of claim 11, wherein the discovery message is sent by the gateway to an IP address associated with the selected packets.

16. Logic encoded on one or more non-transitory tangible media for execution and when executed operable to cause an apparatus to:
receive a discovery message from a gateway;
send an offload query message including an indication that the apparatus serves data packets selected by the gateway to be offloaded;
receive an offloading instruction message from the gateway, wherein the offloading instruction message includes an identification of the selected packets to be offloaded to an Internet;
inspect a first packet to determine that an identification of the first packet matches the identification of the selected packets in the offloading instruction message;
de-capsulate the first packet;
translate a network address in the de-capsulated first packet; and
offload the de-capsulated and network-address-translated first packet to the Internet.

17. The logic of claim 16, wherein the identification of the selected packets in the offloading instruction message includes a TEID of a tunnel associated with the selected packets.

18. The logic of claim 16, wherein the discovery message is sent from the gateway to an IP address associated with the selected packets.

19. The router of claim 11, wherein the offload query message includes an identification of a data path over which the discovery message was received in order to provide the identification of the selected data packets.

20. The logic of claim 16, wherein the offload query message includes an identification of a data path over which the discovery message was received in order to provide the identification of the selected data packets.

* * * * *